(12) United States Patent
Lin et al.

(10) Patent No.: US 11,874,459 B2
(45) Date of Patent: Jan. 16, 2024

(54) DISPLAY DEVICE FOR HEAD-MOUNTING AND DISPLAY METHOD

(71) Applicants: Huawei Technologies Co., Ltd., Shenzhen (CN); THE CHANCELLOR, MASTERS AND SCHOLARS OF THE UNIVERSITY OF CAMBRIDGE, Cambridge (GB)

(72) Inventors: Tao Lin, Shenzhen (CN); Qing Zhang, Shenzhen (CN); Jia Jia, Cambridge (GB); Pawan Shrestha, Cambridge (GB); Matt Pryn, Cambridge (GB); Daping Chu, Cambridge (GB)

(73) Assignees: Huawei Technologies Co., Ltd., Shenzhen (CN); The Chancellor, Masters and Scholars of The University of Cambridge, Cambridge (GB)

( * ) Notice: Subject to any disclaimer, the term of this patent is extended or adjusted under 35 U.S.C. 154(b) by 689 days.

(21) Appl. No.: 17/031,472

(22) Filed: Sep. 24, 2020

(65) Prior Publication Data

US 2021/0011285 A1    Jan. 14, 2021

Related U.S. Application Data

(63) Continuation of application No. PCT/EP2018/058506, filed on Apr. 3, 2018.

(51) Int. Cl.
| | |
|---|---|
| *G02B 27/00* | (2006.01) |
| *G02B 27/10* | (2006.01) |
| *G02B 27/30* | (2006.01) |
| *G02F 1/01* | (2006.01) |
| *G02B 27/28* | (2006.01) |

(52) U.S. Cl.
CPC ....... *G02B 27/0081* (2013.01); *G02B 27/106* (2013.01); *G02B 27/283* (2013.01); *G02B 27/30* (2013.01); *G02F 1/0136* (2013.01)

(58) Field of Classification Search
CPC ......................... G02B 27/0081; G02B 27/106; G02B 27/283; G02B 27/30; G02F 1/0136
USPC .......................................................... 359/629
See application file for complete search history.

(56) References Cited

U.S. PATENT DOCUMENTS

| 7,613,373 B1 | 11/2009 | Dejong |
| 2013/0322810 A1 | 12/2013 | Robbins |

(Continued)

FOREIGN PATENT DOCUMENTS

| CN | 101460883 A | 6/2009 |
| CN | 104503087 A | 4/2015 |
| CN | 105934902 A | 9/2016 |

(Continued)

*Primary Examiner* — Joseph P Martinez
*Assistant Examiner* — Grant A Gagnon
(74) *Attorney, Agent, or Firm* — Leydig, Voit & Mayer, Ltd.

(57) ABSTRACT

The disclosure provides a display device for head mounting, in particular a Maxwellian display device, with an enlarged eye-box. The display device includes a light source emitting light beams for forming an image, an optical system for guiding the light beams to a beam forming element. The beam forming element is configured to converge each of multiple sets of the light beams into a different point of convergence, for example on an exit pupil of the display device. Each point of convergence is a convergent viewing point for a user. The eye-box is thus enlarged.

11 Claims, 9 Drawing Sheets

(56) References Cited

U.S. PATENT DOCUMENTS

2016/0033771 A1 2/2016 Tremblay et al.
2016/0282615 A1 9/2016 Yokoyama

FOREIGN PATENT DOCUMENTS

| CN | 107623803 A | 1/2018 |
|---|---|---|
| EP | 2979128 B1 | 10/2017 |
| WO | 2015081313 A2 | 6/2015 |
| WO | 2017151467 A1 | 9/2017 |

DISPLAY DEVICE FOR HEAD-MOUNTING AND DISPLAY METHOD

CROSS-REFERENCE TO RELATED APPLICATIONS

This application is a continuation of International Patent Application No. PCT/EP2018/058506, filed on Apr. 3, 2018, the disclosure of which is hereby incorporated by reference in its entirety.

TECHNICAL FIELD

The disclosure relates to the field of display devices for head-mounting, i.e. head-mounted display (HMD) devices. The HMD device may, for example, be a Maxwellian display device. The purpose of the disclosure is to enlarge an eye-box of such a display device. To this end, the disclosure proposes an improved display device for head-mounting and a corresponding display method.

BACKGROUND

The concept of HMD devices can be traced back to decades ago but is receiving more attention these days due to the development of new products. The most common type of HMD device is configured to project 2D images into the eyes of a user. A left view image is projected into the left eye, and a right view image is projected into the right eye. Three-dimensional (3D) visual effects are provided to the 2D images like in stereoscopy 3D. However, none of the existing commercial devices provides 3D images better than stereoscopy 3D. Accordingly, the users of such devices still suffer from symptoms like nausea, dizziness, and fake 3D perception, which are particularly caused by the conflict between accommodation cue and the binocular 3D cue, which is known as the Vergence-Accomodation Conflict (VAC).

To avoid the VAC, either a perfect (or at least approximate) depth has to be reconstructed using multiple physical focus planes and using focus variety devices, or accommodation cues need to be removed. However, generating accommodation requires a huge amount of spatial or temporal information bandwidth. Thus, so far there is still no device that is able to produce perfect (or even approximate) accommodation depth cue.

A Maxwellian display device embodies one approach for dealing with the VAC conflict by removing the accommodation. The basic idea behind the Maxwellian display device is to produce ideal light beams, and to project them into the eyes of the user, in order to generate virtual reality.

In particular, in a Maxwellian display device, each pixel of an image is projected into the eye of a user by a very narrow light beam (e.g., with a diameter of less than 0.5 mm), thus making it always focused on the retina. The VAC problem of the HMD devices currently on the market can thus be solved. As a further advantage, the chief components required for a Maxwellian display device are mainly only a scanning display component and reflectors, which makes the whole device comparatively compact.

However, the narrow projection light beams also limit the eye box of the HMD device. Therefore the image projected into the eye will be lost when the eye rotates to a different angle. This is unsuitable for a consumer product.

EP 2 979 128 B1 describes a method for displaying an image projected from a head-worn display with multiple exit pupils. Multiple incidence beams are used to create multiple exit pupils. However, a disadvantage is that multiple light sources are needed to generate the multiple exit pupils. Further, it image brightness for different exit pupils cannot be easily synchronized, which makes the light to the eye less uniform.

SUMMARY

In view of the above-mentioned problems and disadvantages, the disclosure aims at improving the HMD devices currently on the market. The disclosure has in particular the objective of providing a display device for head-mounting, which on the one hand does not suffer from the VAC and on the other hand has an enlarged eye-box. Further, the display device should be comparatively compact. The display device should further not require multiple light sources, and should also be able to provide a uniform light distribution.

This objective is achieved by the solution provided in the enclosed independent claims. Advantageous implementations of the disclosure are further defined in the dependent claims.

In particular the disclosure proposes enlarging the eye-box in an accommodation-free HMD device by using one or more beam forming and/or separation elements to create different viewing points for the user, for instance on an exit pupil of the device.

A first aspect of the disclosure provides a display device suitable for head-mounting, comprising a light source configured to emit light beams for forming an image, and an optical system configured to guide the light beams to a beam forming element. The beam forming element is configured to converge each set of multiple sets of the light beams into a different point of convergence.

Each point of convergence is a convergent viewing point for one and the same image. The points of convergence may, for example, be located on an exit pupil of the device. Accordingly, a user of the device can see the image, for example through the exit pupil of the device, even if he or she rotates the eyeball. Therefore, the eye-box of the display device is effectively enlarged. The display device may, in particular, be a Maxwellian display device, which does not suffer from the VAC. The display device can be quite compact as the beam forming element can be relatively small. Moreover, since each convergent viewing point is created by light from the same light source, uniformity of the light before the user eye is ensured.

In an implementation form of the first aspect, the beam forming element includes a plurality of beam splitters and is configured to produce multiple sets of the light beams by spatially separating the light beams received from the optical system into one set per beam splitter.

Using a plurality of beam splitters is one way of creating the multiple convergent viewing points that effectively enlarge the eye-box as desired. Changing a distance between the beam splitters may change the distance between the viewing points as needed. Using a plurality of beam splitters does not significantly increase the size of the display device compared to a device with just one beam splitter. Arranging the beam splitters in more than one direction allows creating larger two-dimensional eye-boxes.

In a further implementation form of the first aspect, the plurality of beam splitters comprises a first and a second set of beam splitters. The beam splitters of the first set are arranged one after the other in a first direction. The beam splitters of the second set are arranged one after the other in a second direction. The second direction may be perpendicular to the first direction.

In this way, the eye-box can be enlarged in different (e.g., orthogonal directions), such as the horizontal and vertical direction.

In a further implementation form of the first aspect, the optical system includes a first lens configured to collimate the light beams and a second lens configured to receive the collimated light beams and to output converging light beams to the beam forming element.

In this way the light beams from the light source (e.g., one light beam per pixel of the image to be formed) can be guided towards the eye, for instance towards an exit pupil. A Maxwellian display device for head mounting can thus be implemented.

In a further implementation form of the first aspect, a distance between adjacent points of convergence is between 2 mm and 6 mm, e.g., 3 mm.

This distance is in the order of the typical pupil size of the human eye. This avoids a simultaneous apprehension of multiple convergent viewing points by the user. Gaps which are not visibly annoying may be created between the convergent viewing points.

In a further implementation form of the first aspect, the display device further comprises an optical displacer arranged between the light source and the optical system and configured to produce multiple sets of the light beams by spatially separating the light beams received from the light source into two differently polarized sets of light beams.

By means of the optical displacer, the number of viewing points can further be increased by a factor of two. For instance, the device having N beam splitters, 2×N convergent viewing points can be generated. However, it is also possible to build a device without beam splitters and only the optical displacer to generate two convergent viewing points. The optical displacer is also advantageous if a display device with an adjustable distance between two adjacent viewing points is to be provided. This will be explained with reference to the implementation forms described below.

In a further implementation form of the first aspect, the display device further comprises a polarization modulator arranged between the light source and the optical displacer and configured to polarize, when activated, the light beams provided to the optical displacer.

When the light beams provided to the optical displacer are polarized, the optical displacer does not split the light beams into sets of differently polarized light beams. Accordingly, the function of the optical displacer is effectively cancelled. This means that by selectively activating or deactivating the polarization modulator, the number of convergent viewing points and accordingly there inter-distance can be changed.

In a further implementation form of the first aspect, the display device is configured to activate the polarization modulator based on a brightness of the light beams, particularly when the brightness of the light beams is above a determined threshold value.

This may be particularly advantageous because the brightness of the light beams influences the pupil size of the human eye. In particular, the brighter the light beams, i.e. the brighter the image to be formed by the light beams, the smaller the pupil will be. Accordingly, the distance should be adjusted to be smaller, to avoid gaps between images seen by the user when the eyeball is rotated. However, for darker images and larger pupil sizes, the distance should be made larger to avoid multiple convergent viewpoints being seen by the user at the same time.

In a further implementation form of the first aspect, the beam forming element includes a flat combiner with one or more layers and is configured to produce multiple sets of the light beams by spatially separating each of the differently polarized sets of light beams received form the optical system into one set per layer.

Multiple layers of the flat combiner are another way of producing multiple points of convergence and thus multiple convergent viewing points. They can be used instead of a plurality of beam splitters.

In a further implementation form of the first aspect, the flat combiner includes diffractive gratings or holographic gratings.

This is an effective way of implementing the flat combiner, and it allows easy layering.

In a further implementation form of the first aspect, the optical system includes a lens configured to collimate the light beams received from the optical displacer and to output the collimated light beams to the flat combiner.

In a further implementation form of the first aspect, a distance between adjacent points of convergence is between 2 and 6 mm, e.g., 3 mm, if the polarization modulator is deactivated, and between 1 and 3 mm, e.g., 1.5 mm, if the polarization modulator is activated.

These dimensions are advantageous in that they take the pupil size of the human eye in brighter and in darker situations into account, respectively.

In a further limitation from of the first aspect, the light source is a laser scanning projector, particularly a MEMS projector, and each of the emitted light beams relates to one pixel of an image to be formed.

With such a laser scanning projector, a Maxwellian display device can be easily realized, wherein the laser beams have a small width (below 0.5 mm, e.g. 0.1-0.5 mm), and are always focused on the retina.

A second aspect of the disclosure provides a display method, the method comprising emitting light beams for forming an image, and converging each of multiple sets of the light beams into a different point of convergence.

The method of the second aspect and its implementation forms achieve the same advantages and effects as the display device of the first aspect and its respective implementation forms.

A third aspect of the disclosure provides a computer program product comprising a program code for controlling a display device according to the first aspect or any of its implementation forms or for performing, when the program code is executed on a computer, a method according to the second aspect and its respective implementation forms.

Accordingly, the computer program product of the third aspect achieves all advantages and effects of the device of the first aspect of the method of the second aspect, respectively.

It has to be noted that all devices, elements, units and means described in the present application may be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the disclosure will be explained in the following description of specific embodiments in relation to the enclosed drawings.

DETAILED DESCRIPTION OF THE EMBODIMENTS

Figure 1:
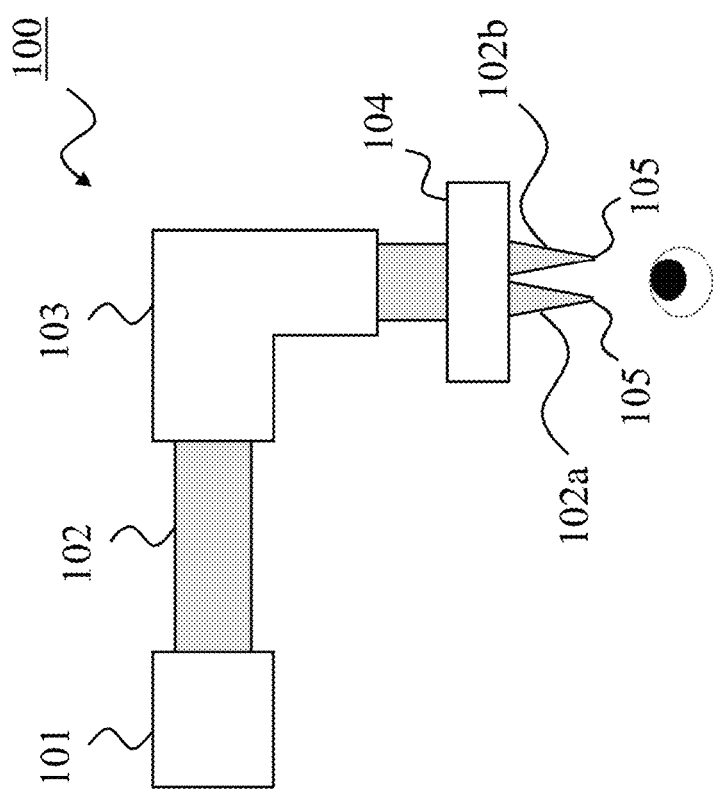
FIG. 1 shows a display device according to an embodiment of the disclosure.

FIG. 1 shows a display device 100 according to embodiment of the disclosure. The display device is particularly suitable for head-mounting, and may thus be referred to as a HMD device.

The display device 100 comprises a light source 101 configured to emit light beams 102 for forming an image. The light source 101 may notably be a laser scanning projector, particularly a MEMS projector, and each emitted light beam 102 may relate to a specific pixel of the image to be formed. Accordingly, the display device 100 may be a Maxwellian display device.

The display device 100 further comprises an optical system 103 configured to guide the light beams 102 to a beam forming element 104. The optical system 103 may include at least one lens and/or at least one mirror, which direct the light beams toward an exit pupil of the display device 100 so that they can reach the eye of a user.

Further, the display device 100 includes the beam forming element 104, which is configured to converge each of multiple sets 102a, 102b of the light beams 102 into a different point of convergence 105. The multiple sets 102a and 102b may be produced by the beam forming element 104 and/or by other optical components of the display device 100, e.g., in the optical system 103 or by components arranged between the optical system 103 and the light source 101. The latter alternative includes an optical displacer, which is described in more detail further below.

Each point of convergence 105 corresponds to a different convergent viewing point for a user of the display device 100, wherein each convergent viewing point provides the same image. Accordingly, when the user rotates one or both eyeballs, he or she can still observe one of the different convergent viewing points. The eye-box of the display device 100 is thus enlarged.

The display device 100 has been described above with respect to one eyeball of the user. Of course, the device 100 can be designed for providing light to both eyes of a user. In this case, the light beams from the light source 112 may be split and guided by two optical systems 103 to two different beam forming elements 104, and produce multiple points of convergence 105 in front of each eye of the user. Also two (synchronized) light sources 101 could be used, one for each eye.

Figure 2:
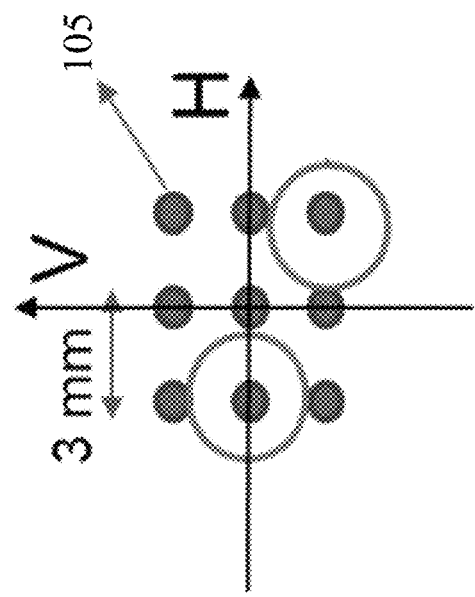
FIG. 2 shows a plurality of points of convergence as convergent viewing points generated by a display device according to an embodiment of the disclosure.

FIG. 2 shows an example for different convergent viewing points (corresponding each to a point of convergence 105 described above). These may notably be arranged in the horizontal (H) and vertical (V) directions. Thereby, a distance between two adjacent points of convergence 105, in either the horizontal or vertical direction, may be between 2 and 6 mm, particularly (as shown in FIG. 2) about 3 mm. The value of 3 mm matches a typical pupil size of the human eye. Thus, the distance between adjacent points of convergence 105 may be in the order of, or larger, than the pupil size. This avoids different convergent viewing points coming into the eye at the same time. The user will thus see the image not more than once. However, if the distance becomes too large, a gap will exist between adjacent convergent viewing points. This may cause image loss when the eyeball is rotated, as well as flickering. Therefore, a proper distance between the convergent viewing points should be chosen. The distance between the convergent viewing points can to this end be adjusted by changing, for instance, the design of the display device 100, particularly of the beam forming element 104. Details thereof are explained further below.

Figure 3:
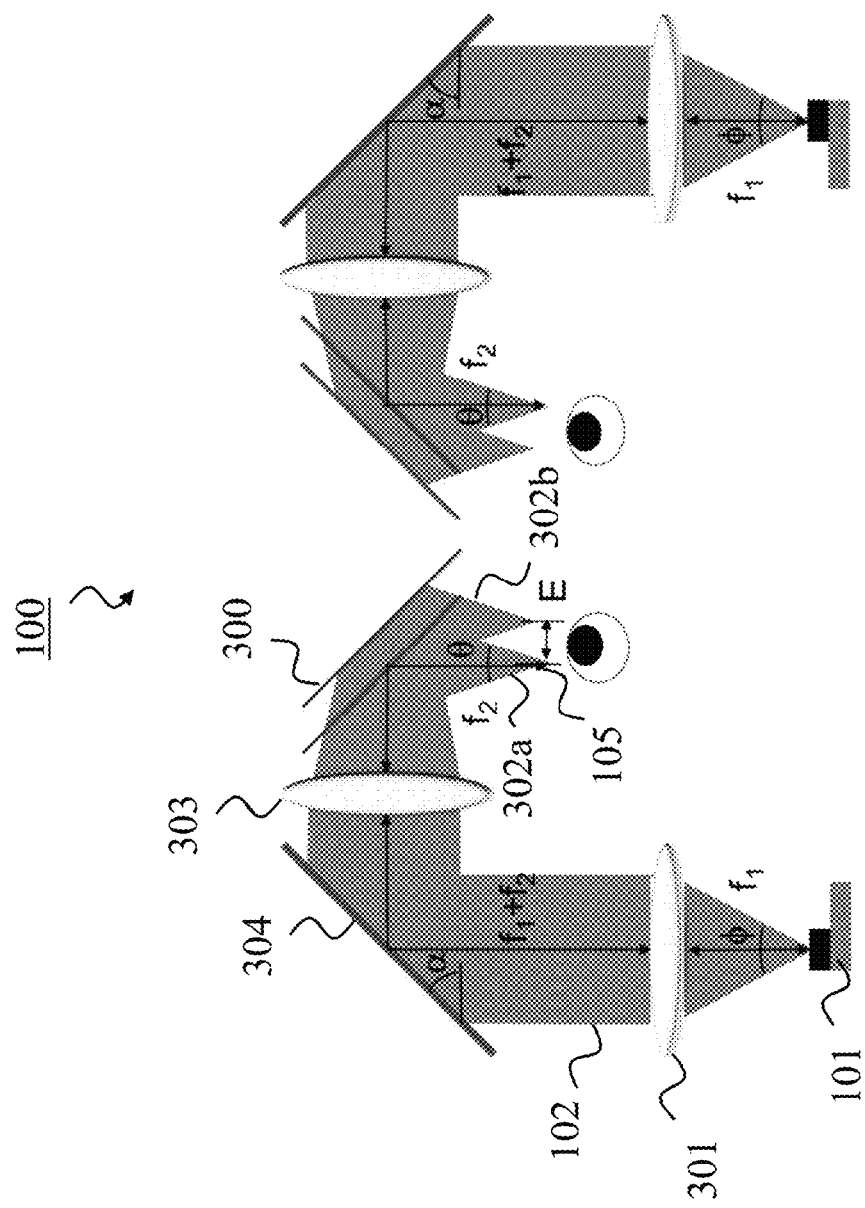
FIG. 3 shows a display device according to an embodiment of the disclosure.

FIG. 3 shows a display device 100 according to an embodiment of the disclosure, which builds on the display device 100 shown in FIG. 1. Same elements in FIG. 1 and FIG. 3 are labelled with the same reference signs and function likewise. Two identical display devices 100, each for one eye, are shown as two parts of a HMD device. In the following, the display device 100 is described with respect to one eye only. In another embodiment, the two parts are implemented in one display device 100.

FIG. 3 illustrates a particularly simple embodiment of the display device 100 for solving the limited eye-box issue of the devices on the market. In this embodiment, the beam forming element 104 includes a plurality of beam splitters 300, and is thereby configured to produce multiple sets of the light beams 102 by spatially separating the light beams 102 received from the optical system 103 into one set 302a, 302b per beam splitter 300.

Further, the optical system 103 of the display device 100 shown in FIG. 3 includes a first lens 301, for instance a Fresnel lens, which is configured to collimate the light beams 102, and a second lens 303, particularly a spherical lens, which is configured to receive the collimated light beams 102 and to output converging light beams 102 to the beam forming element 104, i.e. the plurality of beam splitters 300. The optical system 103 is a confocal system. The optical system 103 may further include a mirror 304, which is used to fold the optical path of the light beams 102 so that the light beams 102 are directed from the light source 101 towards the eye, for instance to an exit pupil of the display device 100.

The light source 101 of the display device 100 shown in FIG. 3 may be a laser scanning projector placed at the focal plane of the first lens 301. An accommodation-free image can be generated by the display device 100.

The plurality of beam splitters 300 may generate the multiple convergent viewing points as exemplarily shown in FIG. 2. Light beams 102 converging on the beam splitters 300 are divided into two by a first beam splitter 300. A first set 302a of the light beams 102 is reflected into a point of convergence 105, and the transmitted light beams 102 are further divided by the second beam splitter 300 into another reflected set 302b converging in another point of convergence 105 (and further transmitted light beams 102). N beam splitters 300 of the display device 100 will in this manner generate N points of convergence 105, and thus N convergent viewing points for the user eye. Since the images for each convergent viewing point are the same, and since the multiple convergent viewing points are distributed in the large area where the eye can freely move without losing the image due to iris-blocking effects, the eye-box of the display device 100 is effectively enlarged. Notably, by changing a distance between the beam splitters 300, the distance between the convergent viewing points is changed. The distance between points of convergence 105 may be approximately equal to the distance between the beam splitters 300.

As schematically shown in FIG. 3, the plurality of beam splitters 300 may be arranged in one direction to enlarge the eye-box, e.g., in the horizontal direction. However, the beam splitters 300 can also be arranged such that they enlarge the eye-box also in another direction, e.g., the vertical direction. This is shown in FIG. 4.

Figure 4:
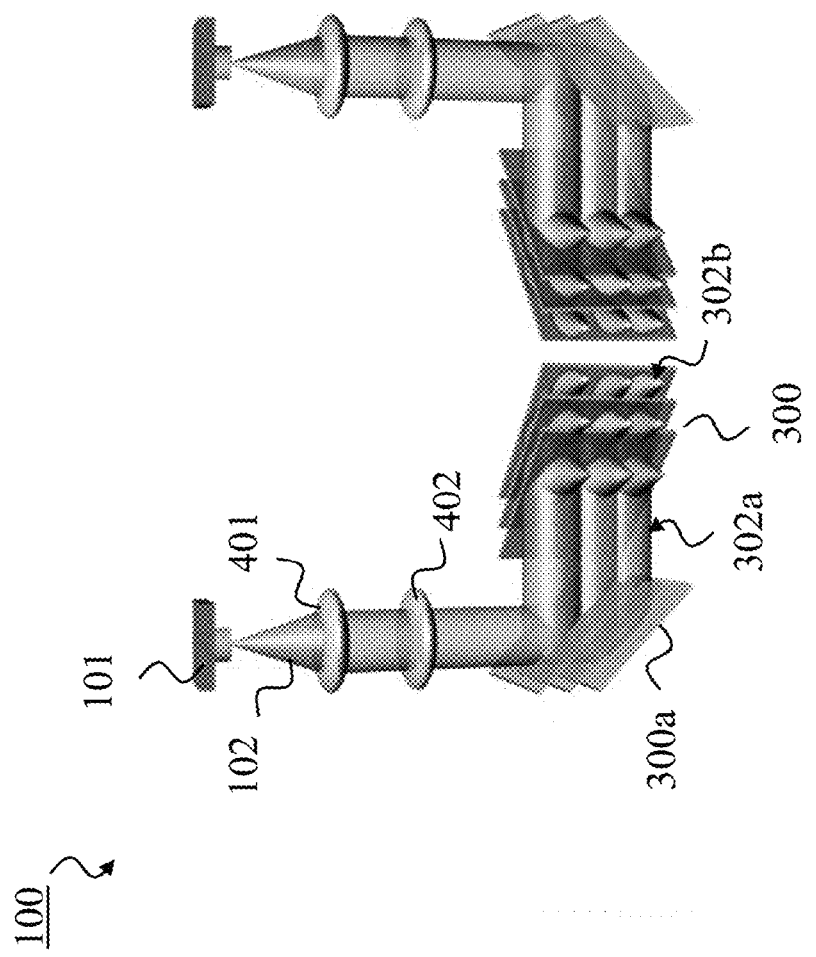
FIG. 4 shows a display device according to an embodiment of the disclosure.

As shown in FIG. 4, two or more sets of beam splitters 300 may be used. A first set 300a of the beam splitters 300 may be arranged, one after the other, in a first direction, for example the horizontal direction. A second set 300b of the beam splitters 300 may be arranged, one after the other, in a second direction, particularly in a second direction perpendicular to the first direction, i.e. for example the vertical direction. The beam splitters 300, which are placed along the vertical direction function to enlarge vertically the eye-box, and the beam splitters 300 placed along the horizontal direction function to enlarge horizontally the eye-box. For example, the 3×3 convergent viewing points shown in FIG. 2 can be generated by six beam splitters 300 arranged in sets of three.

Since the pupil of the human eye dilates in darker situations, and contracts in lighter situations, adjusting the distance between the convergent viewing points along with a change of the pupil size would be of advantage. Taking this into account, display devices 100 using an additional optical component for separating light beams 102, particularly an optical displacer 500, are presented below. The optical displacer 500, which is for instance a calcite displacer, may separate input (un-polarized or mixed-polarized) light beams 102 into two differently polarized, particularly orthogonally polarized, sets 502a and 502b of light beams 102. This is illustrated schematically in FIG. 5.

Figure 5:
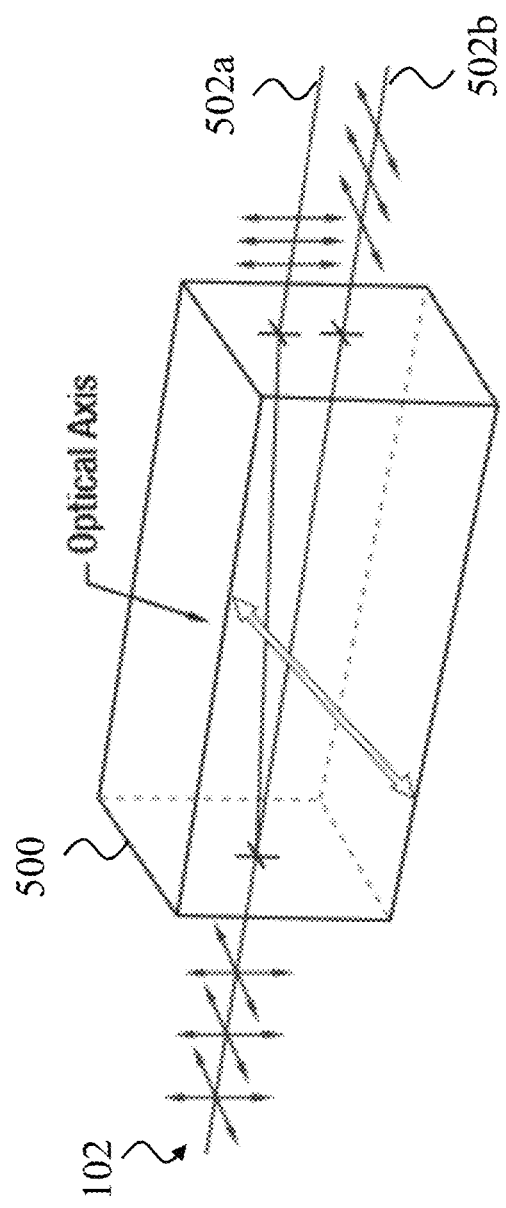
FIG. 5 shows an optical displacer of a display device according to an embodiment of the disclosure.
Figure 6:
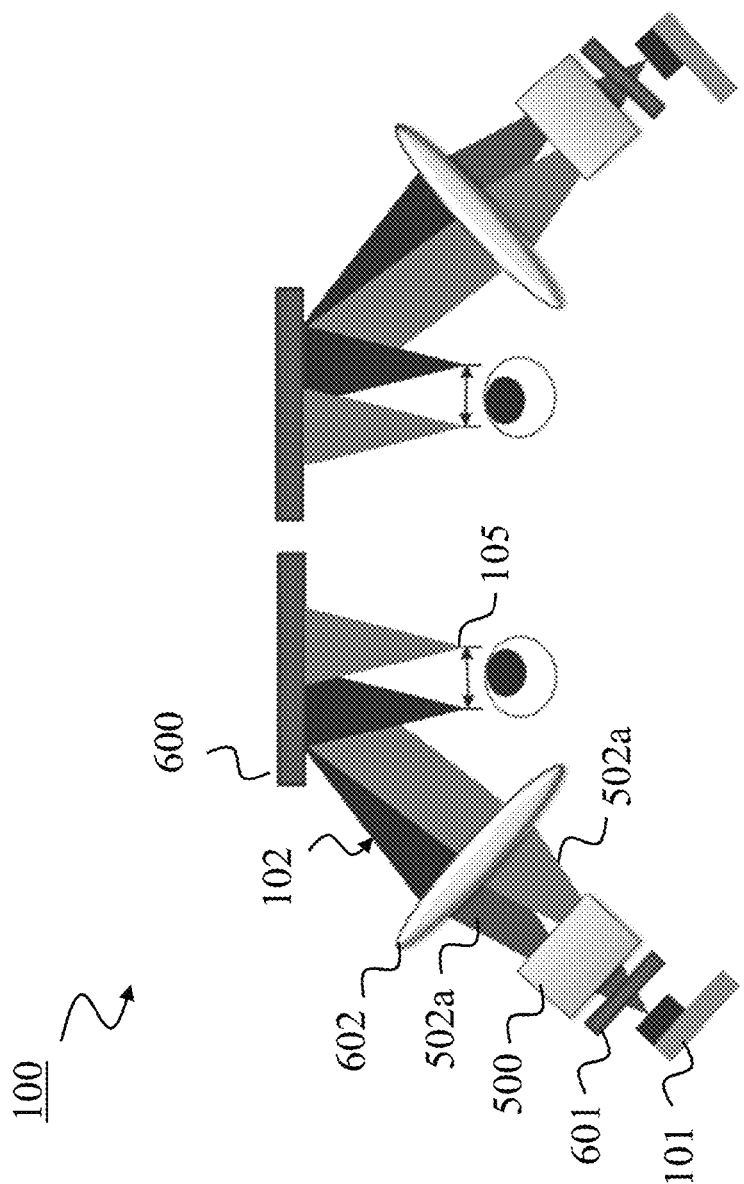
FIG. 6 shows a display device according to an embodiment of the disclosure.

FIG. 6 shows a display device 100 according to an embodiment of the disclosure, which builds on the display device 100 shown in FIG. 1. Same elements in FIG. 6 and FIG. 1 are labelled with the same reference signs and function likewise. The device 100 of FIG. 6 includes an optical displacer 500 as shown in FIG. 5. As in FIG. 3, two identical display devices 100, each for one eye, are shown as two parts (a left one and a right one) of a HMD device. In the following, the display device 100 is described again with respect to one eye only. In another embodiment, the display device 100 comprises both the left part and the right part, as shown in FIG. 6.

In particular, the optical displacer 500 is arranged between the light source 101 and a first lens 602 of the optical system 103. The lens 602 is configured to collimate the light beams 102 received from the optical displacer 500.

The optical displacer 500 is accordingly configured to produce multiple sets of the light beams 102 by spatially separating the light beams 102 received from the light source 101 into two differently polarized sets 502a, 502b of light beams 102. Thus, images projected from the light source 101 are separated into two identical images with different polarization.

The beam forming element 104 in the device 100 of FIG. 6 may notably be a flat combiner 600, which is configured to converge each of the differently polarized sets 502a, 502b of light beams 102 into a point of convergence 105. Accordingly, two different convergent viewing points are created in this display device 100 shown in FIG. 6. The flat combiner 600 may be a volume hologram with lens function, in order to generate the multi-convergent viewing points. The flat combiner 600 may comprise diffractive gratings or holographic gratings.

The device 100 of FIG. 6 may further comprise a polarization modulator 601 arranged between the light source 101 and the optical displacer 500, which is configured to polarize, when activated, the light beams 102 provided to the optical displacer 500. By activating or deactivating the polarization modulator, one of two viewing points are generated by the device 100.

Figure 7:
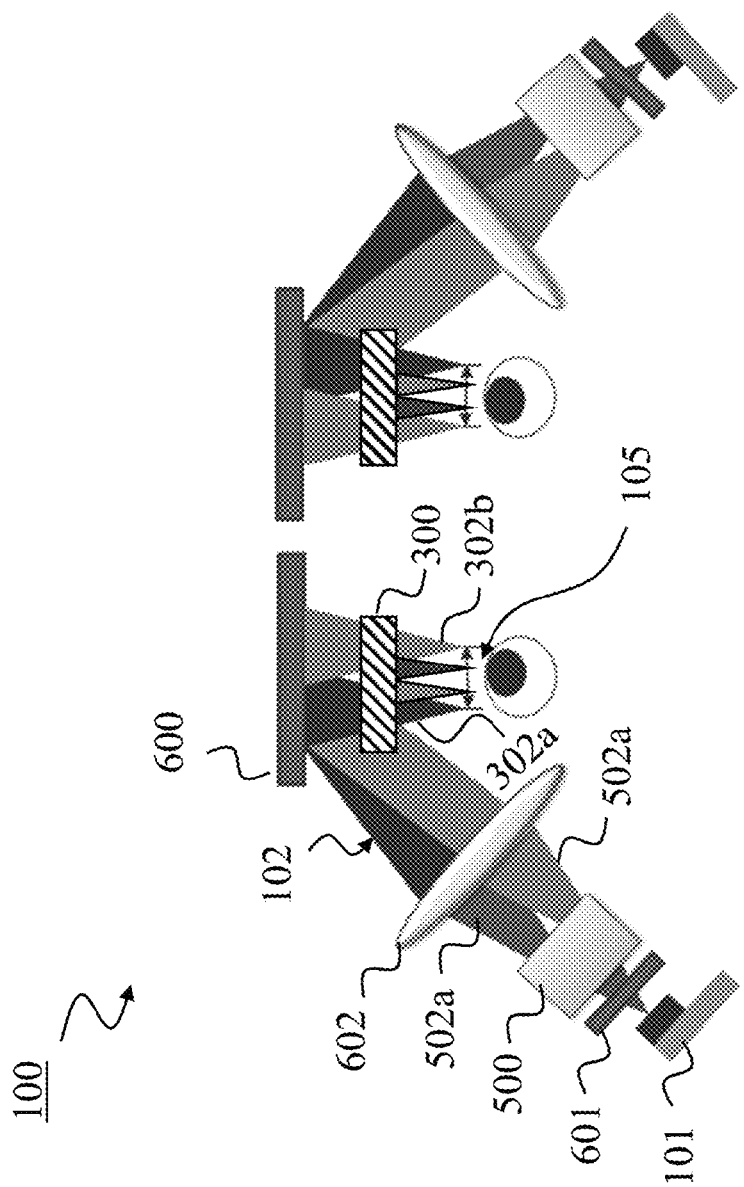
FIG. 7 shows a display device according to an embodiment of the disclosure.

FIG. 7 shows a device 100 according to an embodiment of the disclosure, which builds on the display device shown in FIG. 6. Same elements in FIG. 7 and FIG. 6 have the same reference signs and function likewise. The device 100 in FIG. 7 also includes the polarization modulator 601, the optical displacer 500, and the flat combiner 600. Further, the display device 100 also includes a plurality of beam splitters 300, like the device 100 shown in FIG. 3, which are configured to separate each of the differently polarized sets 502a, 502b of light beams into spatially separated sets 302a and 302b of light beams 102.

N beam splitters 300 with an optical displacer 500 generate 2×N convergent viewing points. The number of beam splitters required for a certain number of targeted viewing points can thus be reduced compared to the device 100 of FIG. 3. On the other hand, the distance between the convergent viewpoints is determined by the displacement of optical displacer 500 and the distance between the beam splitters 300.

The polarization modulator 601 (which has preferably a switch time of less than 2 ms) can be used to make the above-mentioned distance adjustment of the replicated viewpoints. When the polarization modulator 601 is not driven (i.e. not activated), 2×N convergent viewing points with smaller distance will be generated. When the polarization modulator 601 is driven (activated), only the images with one polarization direction are projected, and accordingly N convergent viewing points with larger distance will be generated. A distance between adjacent points of convergence 105 may, for example, be between 2 mm and 6 mm, particularly 3 mm, when the polarization modulator 601 is deactivated, and between 1 mm and 3 mm, particularly 1.5 mm, when the polarization modulator 601 is activated.

In this way, a change of the pupil size of the human eye is taken into account. For instance, the display device 100 may be configured to activate the polarization modulator 601 based on a brightness of the light beams 102, particularly when the brightness of the light beams 102 is above a determined threshold value, since the pupil size of the human eye will be smaller then.

Figure 8:
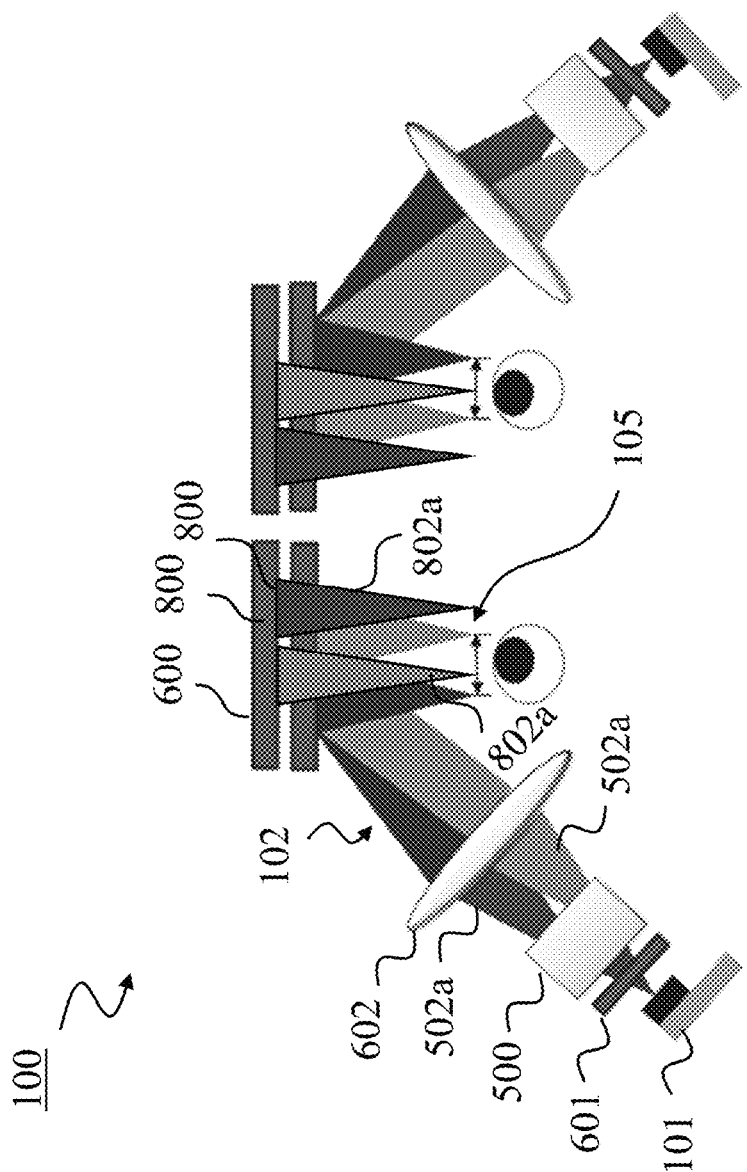
FIG. 8 shows a display device according to an embodiment of the disclosure.

FIG. 8 shows a display device 100 according to an embodiment of the disclosure, which builds on FIG. 6. Same elements in FIG. 8 and FIG. 6 have the same reference signs and function likewise. Compared to the display device 100 shown in FIG. 7, the display device 100 shown in FIG. 8 does not include beam splitters 300. Instead the flat combiner 600 includes a plurality of layers 800. The flat combiner 600 is configured to produce multiple sets of light beams 102 by spatially separating each of the differently polarized sets 502a and 502b of light beams received from the optical system 103 (i.e. the lens 602) into one set 802a, 802b per layer 800. That is, in case of N layers 800, 2×N viewing points can be generated when the polarization modulator 601 is deactivated. If it is activated, N viewing points are generated.

The display device 100 shown in FIG. 8 can also be implemented without the optical displacer 500 and the polarization modulator 601, respectively, i.e. it may have just the flat combiner 600 with multiple layers 800. The flat combiner 600 is configured to produce multiple sets of the light beams (102) by spatially separating the light beams 102 received from the optical system 103 into one set 802a, 802b per layer 800. In this case, for a flat combiner 600 of N layers 800, N convergent viewing points are generated. The distance between the layers 800 can be adjusted to change the distance between adjacent points of convergence 105.

Figure 9:
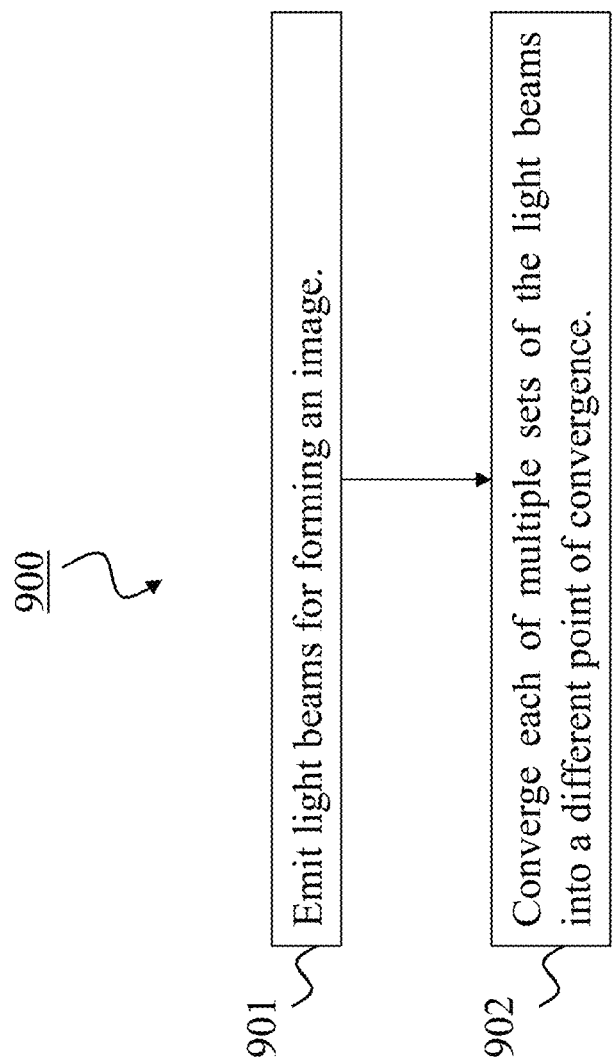
FIG. 9 shows a method according to an embodiment of the disclosure.

FIG. 9 shows a method 900 according to an embodiment of the disclosure. The method 900 comprises a step 901 of emitting light beams 102 for forming an image. Further, the method 900 comprises a step 902 of converging each of multiple sets 102a, 102b of the light beams 102 into a different point of convergence 105. The method 900 can be performed by any display device 100 shown in the previous figures and explained above.

In summary the disclosure proposes using multiple beam splitters 300 or a plurality of flat combiner layers 800, either of these alternatives optionally being combined with an optical displacer 500, in order to create multiple convergent viewing points by converging the light beams 102 of the light source 101 in multiple points, in order to enlarge the eye-box of a display device 100.

The disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A display device suitable for head-mounting, comprising
   a light source configured to emit light beams for forming an image;
   an optical system configured to guide the light beams to a beam forming element, wherein the beam forming element is configured to converge each set of multiple sets of the light beams into a different point of convergence;
   an optical displacer arranged between the light source and the optical system and configured to produce multiple sets of the light beams by spatially separating the light beams received from the light source into two differently polarized sets of light beams;
   a polarization modulator arranged between the light source and the optical displacer and configured to polarize, when activated, the light beams provided to the optical displacer, wherein the display device is configured to activate the polarization modulator based on a brightness of the light beams when the brightness of the light beams is above a determined threshold value.

2. The display device according to claim 1, wherein the beam forming element includes a plurality of beam splitters and is configured to produce multiple sets of the light beams by spatially separating the light beams received from the optical system into one set per beam splitter.

3. The display device according to claim 1, wherein
   a first set of the beam splitters is arranged one after the other in a first direction, and
   a second set of the beam splitters is arranged one after the other in a second direction, particularly in a second direction perpendicular to the first direction.

4. The display device according to claim 2, wherein the optical system includes a first lens configured to collimate the light beams and a second lens to receive the collimated light beams and output converging light beams to the beam forming element.

5. The display device according to claim 2, wherein
   a distance between adjacent points of convergence is between 2 mm and 6 mm.

6. The display device according to claim 1, wherein the beam forming element includes a flat combiner with one or more layers and is configured to produce multiple sets of the light beams by spatially separating each of the differently polarized sets of light beams received form the optical system into one set per layer.

7. The device according to claim 6, wherein
   the flat combiner includes diffractive gratings or holographic gratings.

8. The device according to claim 6, wherein
   the optical system includes a lens configured to collimate the light beams received from the optical displacer and output the collimated light beams to the flat combiner.

9. The display device according to claim 6, wherein
   a distance between adjacent points of convergence is between 2 mm and 6 mm when the polarization modulator is deactivated, and is between 1 mm and 3 mm when the polarization modulator is activated.

10. The display device according to claim 9, wherein
    the light source is a laser scanning projector and each of the emitted light beams relates to one pixel of an image to be formed.

11. A display method, comprising
    emitting light beams for forming an image;
    converging each of multiple sets of the light beams into a different point of convergence;
    producing, by an optical displacer arranged between the light source and the optical system, multiple sets of the light beams by spatially separating the light beams received from the light source into two differently polarized sets of light beams;
    polarizing, by a polarization modulator arranged between the light source and the optical displacer, when activated, the light beams provided to the optical displacer, wherein polarization is activated based on a brightness of the light beams.

* * * * *